(12) United States Patent
Dinsmore et al.

(10) Patent No.: US 6,449,814 B1
(45) Date of Patent: Sep. 17, 2002

(54) TRIM FASTENER CLIP EMPLOYING MULTIPLE LINES-OF-CONTACT STABILIZATION

(75) Inventors: Michael A. Dinsmore, Kalamazoo, MI (US); Kristie A. Kubinski, Scotts, MI (US); Robert V. Rhea, Vicksburg, MI (US); Benjamin D. Schultheiss, Kalamazoo, MI (US)

(73) Assignee: Summit Polymers, Inc., Kalamazoo, MI (US)

( * ) Notice: Subject to any disclaimer, the term of this patent is extended or adjusted under 35 U.S.C. 154(b) by 0 days.

(21) Appl. No.: 09/682,518

(22) Filed: Sep. 13, 2001

(51) Int. Cl.⁷ .............................. F16B 2/22; F16B 19/00
(52) U.S. Cl. ............................ 24/297; 24/289; 24/292
(58) Field of Search .................. 24/289, 458, 292–297, 24/546, 570, 573.1, 581.11, 578.13; 52/717.05, 718.03, 718.04, 718.06; 293/115, 128; 296/214; 411/508, 509, 510, 913

(56) References Cited

U.S. PATENT DOCUMENTS

| | | | |
|---|---|---|---|
| 2,574,330 A | * 11/1951 | Judd | .................... 403/107 |
| 3,197,935 A | 8/1965 | Clancy et al. | |
| 3,208,119 A | 9/1965 | Seckerson | |
| 3,213,506 A | 10/1965 | Fernberg | |
| 3,869,958 A | 3/1975 | Murayama | |
| 4,312,614 A | * 1/1982 | Palmer et al. | .............. 24/297 X |
| 4,402,118 A | 9/1983 | Benedetti | |
| 4,422,222 A | 12/1983 | Notoya | |
| 4,644,612 A | 2/1987 | Osterland | |
| 4,778,320 A | 10/1988 | Nakama | |
| 4,781,504 A | * 11/1988 | Yuta | ........................ 411/508 X |
| 5,533,237 A | * 7/1996 | Higgins | ........................ 24/289 |
| 5,966,782 A | * 10/1999 | Ishohara et al. | ............... 24/297 |
| 6,074,150 A | * 6/2000 | Shinozaki et al. | ......... 24/297 X |
| 6,101,686 A | * 8/2000 | Velthoven et al. | ............. 24/295 |
| 6,119,316 A | * 9/2000 | Ishihara et al. | ................ 24/297 |
| 6,141,837 A | * 11/2000 | Wisniewski | .................... 24/295 |
| 6,279,207 B1 | * 8/2001 | Vassiliou | ...................... 24/293 |

FOREIGN PATENT DOCUMENTS

| | | | | |
|---|---|---|---|---|
| JP | 7293521 A | | 11/1995 | |
| JP | 408200333 A | * | 8/1996 | |
| JP | 408270629 A | * | 10/1996 | |
| JP | 409229032 A | * | 9/1997 | |
| JP | 200020521 A | * | 7/2000 | |
| JP | 2001050228 A | * | 2/2001 | ................... 24/297 |
| JP | 2000103954 A | * | 10/2001 | ................... 24/297 |
| JP | 2001330011 A | * | 11/2001 | ................... 24/297 |

* cited by examiner

*Primary Examiner*—Robert J. Sandy
*Assistant Examiner*—Ruth C. Rodriguez
(74) *Attorney, Agent, or Firm*—McGarry Bair LLP

(57) ABSTRACT

A fastener is provided for mounting a first structure having an insertion rib with a retention slot to a second structure having a mounting opening. The fastener comprises a U-shaped body having a bight portion at an upper portion thereof with a pair of outer legs depending therefrom. Each of the pair of outer legs has an outer surface adapted to receive an edge of the mounting opening to removably mount the outer legs to the second structure, and a pair of inner legs between the pair of outer legs. The pair of inner legs cooperate to define at least in part an elongated channel therebetween having opposing inner surfaces adapted to receive the insertion rib. Each of the inner legs has, at a lower portion thereof, a retainer adapted to be received within the retention slot.

64 Claims, 14 Drawing Sheets

US 6,449,814 B1

TRIM FASTENER CLIP EMPLOYING MULTIPLE LINES-OF-CONTACT STABILIZATION

BACKGROUND OF INVENTION

1. Field of the Invention

The present invention relates to a clip or fastener used for removably mounting a first structure provided with an insertion rib with an insertion slot to a second structure provided with a mounting opening. Typically, the first structure is a trim piece and the second structure is an instrument panel or other vehicular sub-structure.

2. Description of the Related Art

Trim fastener clips are well known in the vehicular trim and molding art to mount a first structure 200, such as a trim piece to a second vehicular sub-structure 202, such as an instrument panel, by several clips 204 (see FIGS. 18–19 for examples of these mounting configurations).

These types of fastener clips typically comprise a U-shaped member defined by a pair of outer legs which are interconnected by a bight portion allowing flexure of the outer legs about the bight portion. In addition, one or more inner legs typically depend from the bight portion, between the outer legs, and have an inwardly-extending detent thereon.

These types of trim fastener clips are typically mounted on a first structure having an insertion rib provided with an insertion slot by passing the insertion rib between the inner legs until the detent thereon engages within the insertion slot. Thus, the inner legs retain the fastener clip on the insertion rib by the removable engagement of the detent within the insertion slot. In addition, the trim fastener clip is then employed to mount the first structure to a second structure having a mounting opening. The bight portion of the U-shaped member is passed into the mounting opening until lateral edges of the mounting opening of the second structure engage within recesses in the outer legs of the U-shaped member. Thus, the first structure is retained against the second structure by the trim fastener clip. One example of a prior art trim fastener clip in shown in U.S. Pat. Nos. 5,966,782 and 6,119,316 both to Ishihara et al., issued Oct. 19, 1999 and Sep. 19, 2000, respectively.

There remains some problems with the prior art trim fastener clips. First, these types of clips typically employ either a single point-contact stabilization means for the inner legs of the fastener clip to engage the outer surfaces of the insertion rib or planar surfaces on the inner legs which squeezingly contact the outer surfaces of the insertion rib. In either event, the engagement of the inner legs of the fastener clip with the outer surfaces of the insertion rib is either too unstable or, in the case of the use of planar surfaces on the trim fastener clip inner legs, is too difficult and costly to manufacture a clip which has surfaces that are exactly parallel and can grip the outer surfaces of the insertion rib. Second, these types of clips, being somewhat small in size, are difficult to mount on an insertion rib and often the insertion rib becomes lodged between the inner surfaces of an outer legs and an outer surface of the inner leg, rather than between the inner legs as desired. Third, for clips that have a high height-to-width ratio, the outer legs can have too much flexure inherent therein which can cause inadvertent dislodgement of the outer legs of the trim fastener clip from the mounting opening of the second structure. Fourth and finally, the clips are difficult to mount to foam-type substructures which have varying sizes, thicknesses and tolerances.

SUMMARY OF INVENTION

The inventive fastener clip described herein overcomes the limitations of the prior art by providing a fastener clip which is more easily insertable onto an insertion rib having an aperture and is stably maintained in place by a mounting structure on inner legs on the clip which define multiple lines of contact with the insertion rib thereon. The clip also includes guide members which prevent misalignment and mis-mounting of the clip onto an insertion rib by directing an end of the insertion rib between the inner legs of the clip. On clips with a high height-to-width aspect ratio, the invention also contemplates stand-off protrusions mounted on inner surfaces of outer legs on the clip which abut the insertion rib to prevent over-flexure of the outer legs thereof. The invention also contemplates the provision of tensioning ribs on laterally-extending feet on the outer legs of the clip to maintain the feet in tension against a vehicular substructure of varying thickness and tolerances.

In one aspect, the invention relates to a fastener for mounting a first structure having an insertion rib with a retention slot to a second structure having a mounting opening comprising a U-shaped body. A bight portion is provided at an upper portion thereof with a pair of outer legs depending therefrom, each of the pair of outer legs having an outer surface adapted to receive an edge of the mounting opening to removably mount the outer legs to the second structure. A pair of inner legs is provided between the pair of outer legs, the pair of inner legs cooperating to define at least in part an elongated channel therebetween having opposing inner surfaces adapted to receive the insertion rib. Each of the inner legs preferably having, at a lower portion thereof, a retainer adapted to be received within the retention slot. An improvement thereof comprises at least one of the inner surfaces of the elongated channel having a variable curvature thereon defining at least two lines of contact with the insertion rib in a spaced vertical relationship.

In various embodiments of the invention, both inner surfaces can have the variable curvature. The variable curvature on one of the inner surfaces can mirror that on the other inner surface. The variable curvature can be undulating with a first radius of curvature, a second radius of curvature, a third radius of curvature and a fourth radius of curvature in alternating convex/concave relationship. The second and fourth radii of curvature can define the at least two points of contact. The second radius of curvature can be approximately ten times as large as the first radius of curvature. The third radius of curvature can be approximately two times as large as the second radius of curvature. The fourth radius of curvature can be approximately four times as large as the third radius of curvature.

The pair of outer legs can extend downwardly to a greater extent than the pair of inner legs; and can further comprise guide members extending from the lower portion of the inner legs downwardly to the outer legs and forming a guide for aligning the insertion rib with the elongated channel as the insertion rib is inserted between the pair of outer legs. The guide members can be flexible and flex with the flexure of the inner and outer legs. The retainer can have a leading edge thereon for camming the inner legs apart during mounting of the fastener onto the insertion rib. The guide member can have a leading edge in planar alignment with the retainer leading edge.

At least one of the pair of outer legs can further comprise a stand-off protrusion extending inwardly a sufficient extent to maintain contact with the insertion rib when the insertion rib is positioned within the elongated channel to prevent inward flexing of the lower portion of the at least one of the pair of outer legs during mounting of the fastener to the second structure and inadvertent overtravel of the fastener relative to the mounting opening thereof. The lower portion of the at least one of the pair of the outer legs can terminate in an outwardly extending flange that is adapted to abut an underside of the second structure when the fastener is mounted to the second structure. The outwardly extending flange can be spaced downwardly from the stand-off protrusion. The guide member can be spaced upwardly from the stand-off protrusion to permit flexure of the outer legs therebetween. The outer legs can have a thin-walled portion between the guide member and the stand-off protrusion to facilitate flexure of the outer legs therebetween. The stand-off protrusions can form a fulcrum for flexure of the pair of outer legs during mounting of the fastener to the second structure. Each of the pair of outer legs can have a stand-off protrusion thereon.

The outer surface of the pair of outer legs can have a shoulder adapted to receive an upper edge of the mounting opening. A lower portion of at least one of the outer legs can terminate in an outwardly extending flange that is adapted to abut an underside of the second structure during mounting of the fastener to the second structure. The outwardly-extending flange can have an upwardly-extending tensioning rib thereon adapted to abut the underside of the second structure to bias the second structure against the shoulder whereby the fastener can be used with second structures of varying thickness and tolerances. The tensioning rib can be located at an outer portion of the outwardly-extending flange. The tensioning rib can be generally semi-circular in cross section.

In another aspect, the invention relates to a fastener for mounting a first structure having an insertion rib with a retention slot to a second structure having a mounting opening comprising a U-shaped body having a bight portion at an upper portion thereof with a pair of outer legs depending therefrom, each of the pair of outer legs having an outer surface adapted to receive an edge of the mounting opening to removably mount the outer legs to the second structure. A pair of inner legs is provided between the pair of outer legs, the pair of inner legs cooperating to define at least in part an elongated channel therebetween having opposing inner surfaces adapted to receive the insertion rib, each of the inner legs having, at a lower portion thereof, a retainer adapted to be received within the retention slot. The improvement of the invention comprising the pair of outer legs can extend downwardly to a greater extent than the pair of inner legs, and further comprising guide members extending from the lower portion of the inner legs downwardly to the outer legs and forming a guide for aligning the insertion rib with the elongated channel as the insertion rib is inserted between the pair of outer legs.

In other embodiments of the invention, the guide members can be flexible and flex with the flexure of the inner and outer legs. The retainer can have a leading edge thereon for camming the inner legs apart during mounting of the fastener onto the insertion rib. The guide member can have a leading edge in planar alignment with the retainer leading edge. The retainer can have a leading edge thereon for camming the inner legs apart during mounting of the fastener onto the insertion rib.

At least one of the pair of outer legs can further comprise a stand-off protrusion extending inwardly a sufficient extent to maintain contact with the insertion rib when the insertion rib is positioned within the elongated channel to prevent inward flexing of the lower portion of the at least one of the pair of outer legs during mounting of the fastener to the second structure and inadvertent overtravel of the fastener relative to the mounting opening thereof. The lower portion of the at least one of the pair of the outer legs can terminate in an outwardly extending flange that is adapted to abut an underside of the second structure when the fastener is mounted to the second structure. The outwardly extending flange can be spaced downwardly from the stand-off protrusion. The guide member can be spaced upwardly from the stand-off protrusion to permit flexure of the outer legs therebetween. The outer legs can have a thin-walled portion between the guide member and the stand-off protrusion to facilitate flexure of the outer legs therebetween. The stand-off protrusions can form a fulcrum for flexure of the pair of outer legs during mounting of the fastener to the second structure. Each of the pair of outer legs can have a stand-off protrusion thereon.

The outwardly-extending flange can have an upwardly-extending tensioning rib thereon adapted to abut the underside of the second structure to bias the second structure against the shoulder whereby the fastener can be used with second structures of varying thickness and tolerances. The tensioning rib can be located at an outer portion of the outwardly-extending flange. The tensioning rib can be generally semi-circular in cross section.

In yet another aspect, the invention relates to a fastener for mounting a first structure having an insertion rib with a retention slot to a second structure having a mounting opening comprising a U-shaped body having a bight portion at an upper portion thereof with a pair of outer legs depending therefrom, each of the pair of outer legs having an outer surface adapted to receive an edge of the mounting opening to removably mount the outer legs to the second structure. A pair of inner legs between the pair of outer legs, the pair of inner legs cooperating to define at least in part an elongated channel therebetween having opposing inner surfaces adapted to receive the insertion rib, each of the inner legs having, at a lower portion thereof, a retainer adapted to be received within the retention slot. The inventive improvement hereof comprising a lower portion of at least one of the pair of outer legs further comprises a stand-off protrusion extending inwardly a sufficient extent to maintain contact with the insertion rib when the insertion rib is positioned within the elongated channel to prevent inward flexing of the lower portion of the at least one of the pair of outer legs during mounting of the fastener to the second structure and inadvertent overtravel of the fastener relative to the mounting opening thereof.

In other embodiments of the invention, the lower portion of the at least one of the pair of the outer legs can terminate in an outwardly extending flange that is adapted to abut an underside of the second structure when the fastener is mounted to the second structure. The outwardly extending flange can be spaced downwardly from the stand-off protrusion. Guide members can extend from the lower portion of the inner legs downwardly to the outer legs and form a guide for aligning the insertion rib with the elongated channel as the insertion rib is inserted between the pair of outer legs. Each guide member can be spaced upwardly from the stand-off protrusion to permit flexure of the outer legs therebetween. The outer legs can have a thin-walled portion between the guide member and the stand-off protrusion to facilitate flexure of the outer legs therebetween. The stand-off protrusions can form a fulcrum for flexure of the pair of outer legs during mounting of the fastener to the second structure. Each of the pair of outer legs can have a stand-off protrusion thereon.

In a further embodiment, a fastener for mounting a first structure having an insertion rib with a retention slot to a second structure having a mounting opening comprising a U-shaped body having a bight portion at an upper portion thereof with a pair of outer legs depending therefrom, each of the pair of outer legs having an outer surface with a shoulder adapted to receive an edge of the mounting opening to removably mount the outer legs to the second structure, wherein a lower portion of at least one of the outer legs terminates in an outwardly extending flange that is adapted to abut an underside of the second structure during mounting of the fastener to the second structure. A pair of inner legs between the pair of outer legs, the pair of inner legs cooperating to define at least in part an elongated channel therebetween having opposing inner surfaces adapted to receive the insertion rib, each of the inner legs having, at a lower portion thereof, a retainer adapted to be received within the retention slot. An improvement thereof comprising the outwardly-extending flange can have an upwardly-extending tensioning rib thereon adapted to abut the underside of the second structure to bias the second structure against the shoulder whereby the fastener can be used with second structures of varying thickness and tolerances.

In other embodiments of the invention, the tensioning rib can be located at an outer portion of the outwardly-extending flange. The tensioning rib can be generally semicircular in cross section.

DETAILED DESCRIPTION

Figure 1:
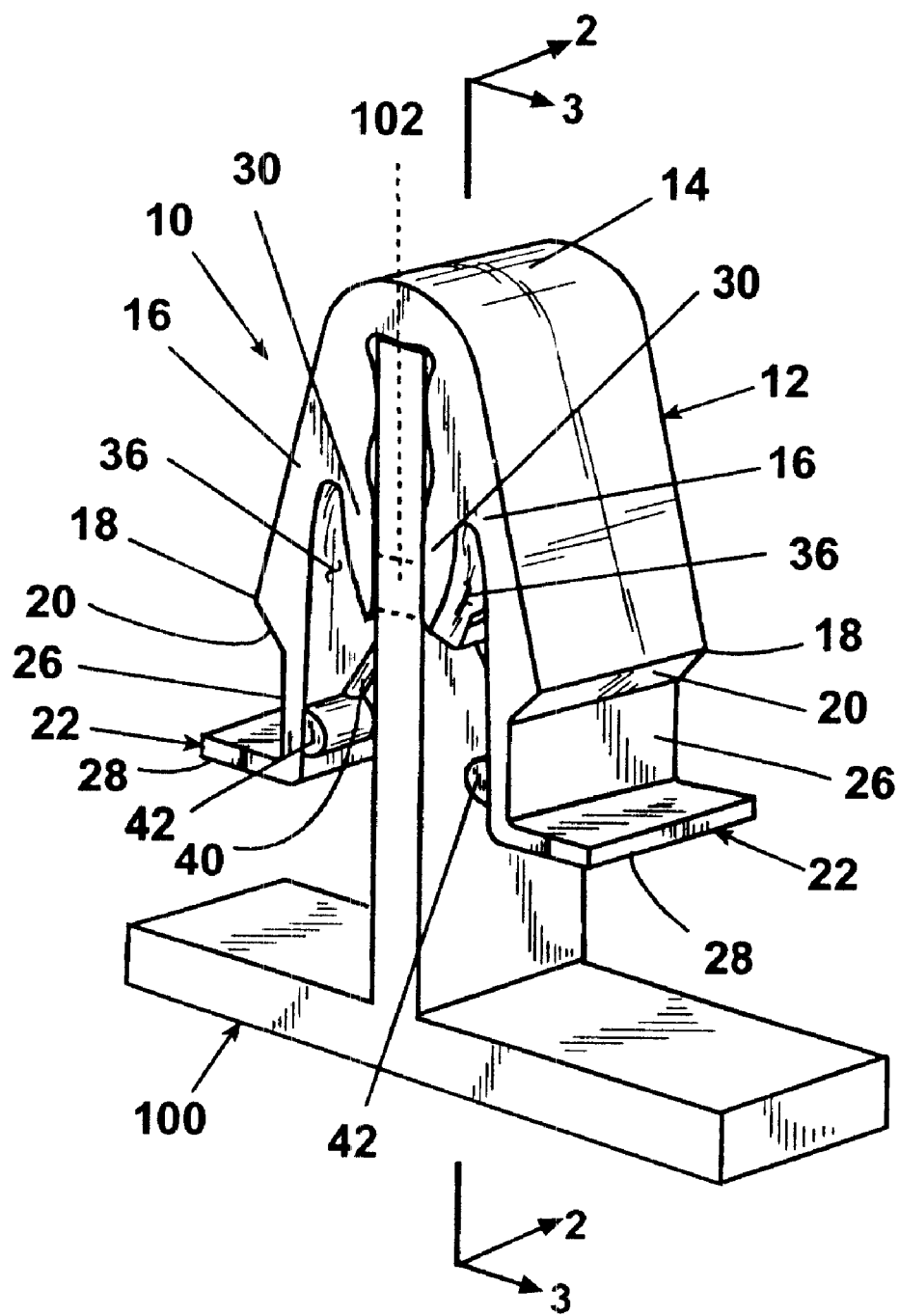
FIG. 1 shows a perspective view of a first embodiment of a fastener clip according to the invention showing the fastener clip mounted on an insertion rib having an insertion opening.
Figure 2:
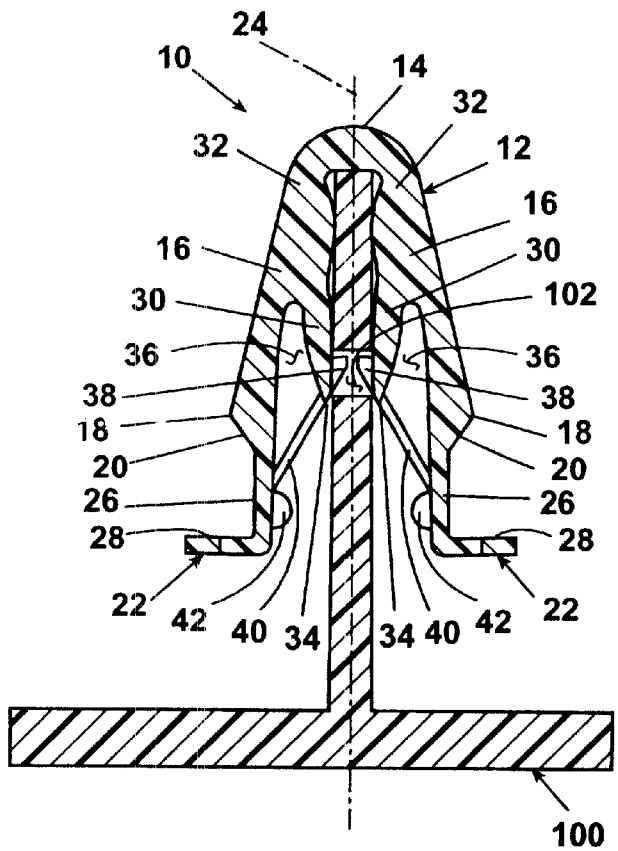
FIG. 2 is a cross-sectional view of the first embodiment of the fastener clip taken along lines 2—2 of FIG. 1.
Figure 3:
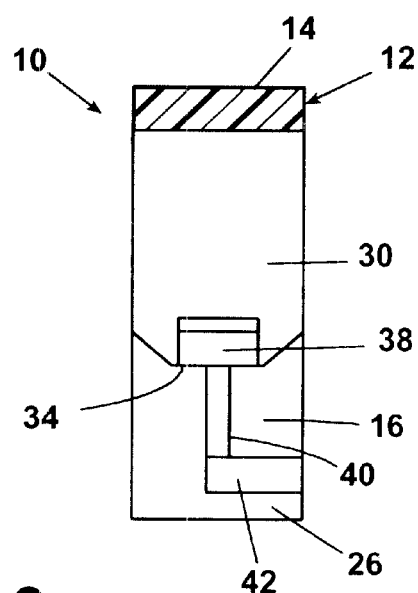
FIG. 3 is also a cross-sectional view of the first embodiment of the fastener clip taken along lines 3—3 of FIG. 1.

Referring now to the drawings and to FIGS. 1–3 in particular, a first embodiment of a trim fastener clip is shown by reference numeral 10 comprising a U-shaped body 12 having a bight portion 14 and a pair of depending outer legs 16 extending therefrom. The bight portion 14 has a rounded outer surface thereon which is substantially flush with the outer surface of each of the outer legs 16. Each of the outer legs 16 is further provided with a shoulder 18 that terminates in a ramped surface 20 which functions as a retaining surface or when the U-shaped body 12 is inserted into an aperture in a vehicular sub-structure such as a trim molding piece (described generally later with respect to FIGS. 13–15).

The ramped surfaces 20 each terminate in an L-shaped flange 22 that extends laterally outwardly from a medial axis 24 of the body 12. For purposes of this description, it will be understood that the terms "inner" and "outer" are used with reference to the medial axis whereby "inner" refers to a point closer in proximity to the medial axis 24 than an element referred to as "outer".

The L-shaped flanges 22, each formed from a generally vertical portion 26, extending from a terminus of the corresponding ramped surface 20, and a generally horizontal portion 28 extending from a terminus of the vertical portion 26. The ramped surfaces 20 and the L-shaped flanges 22 cooperate to define a receiving area for the vehicular sub-structure. The L-shaped flange 22 operates to prevent "push-through" of the clip 10 when it is inserted into the mounting opening of the vehicular sub-structure, i.e., the generally horizontal portions 28, being preferably wider than the mounting opening, catch on the sub-structure after the clip 10 is inserted through the mounting opening.

It will be understood that the configuration of the bight portion 14, the outer surface of the outer legs 16, the shoulder 18, the ramped portion 20 and the L-shaped flanges 22 can be selected to provide desirable loading, insertion, retention and removal forces as needed for a particular application. Wide variation in these configurations can be had without departing from the scope of the invention described herein. For example, the outer surfaces of the outer legs 16, while shown as planar in FIGS. 1–2, can be provided with various curvatures or other continuous or discontinuous surface features to provide variable insertion forces into a mounting opening in a vehicular sub-structure. The shoulder 18 can be made angular or rounded as need be. Leading and trailing angles of the ramped surface 20 with respect to the outer surface of the outer leg 16 and the vertical portion 24 of the L-shaped flange 22, respectively, can be selected to provide a desired retention and removal force. Further, the size and angular configuration of the vertical and horizontal portions 26 and 28 of the L-shaped flange 22 can be had as well.

While the features of the outer legs 16, shoulder 18, ramped surface 20 and L-shaped flange 22 on each side of the U-shaped body 12 of the fastener clip 10 function to retain the clip 10 within a mounting opening in a vehicular sub-structure, the interior of the clip 10 functions to retain the clip on an insertion rib 100 having an insertion slot 102 therein.

Along these lines, an interior surface of the body 12 is provided with a pair of opposed inner legs 30 which depend generally vertically from a general area of the body 12 at or between the bight portion 14 and each of the outer legs 16 generally adjacent to the medial axis 24 of the clip 10.

Each inner leg is preferably wider at a proximal end 32 thereof (i.e., the portion of the inner leg 30 that is integrally formed with the bight portion 14 and/or the outer legs 16) and narrows along the length of the inner leg 30 to a distal end 34. This narrowing configuration of the inner legs 30 provides greater flexure of the inner leg 30 nearer the distal end 34 than the proximal end 32. However, due to this narrowing of the inner leg 30, a gap 36 is defined between the inner surface of the outer leg 16 and the outer surface of the inner leg 30 near the distal end thereof.

Each inner leg 30 is provided with a detent 38 extending generally laterally from the inner surface of the inner leg 30 toward the medial axis 24 and is positioned in a juxtaposed relationship with respect to the other detent 38 on the opposite inner leg 30. While the detent 38 is shown as a generally triangular member having a ramped leading surface thereon, the detent 38 can be any suitable geometric configuration, including rectangular and semi-circular, which accomplishes the desired function of retaining the corresponding inner leg 30 within the insertion slot 102 in the insertion rib 100.

A guide member 40 is provided between the inner surface of each outer leg 16 and the outer surface of each inner leg 30. As can be seen from the drawings, the guide member 40 preferably comprises an elongated web that is contiguously formed with the inner surface of each outer leg 16 and the outer surface of each inner leg 30. In this manner, the entire gap 36 is traversed by the guide member 40 to aid assembly of the clip 10 onto the insertion rib 100.

It shall be noted that a semicircular rib 42 is formed on the inner surface of each of the outer legs 16 at the point where the guide member 40 intersects the inner surface of the corresponding outer leg 16. The rib 42 essentially serves as a molding facilitation component created for an insertion pin in an ejection mold. An ejector pin aids in demolding the part evenly. The rib 42 also provides another benefit in that it abuts the insertion rib 100 during large flexure of the outer legs 16 (such as during insertion into a particularly small mounting aperture in a vehicular sub-structure) and provides an inner limit of flexure of the outer legs 16 and prevents breakage of the outer legs 16 due to over-flexure thereof.

Second, third and fourth embodiments of the fastener clip according to the invention are shown in FIGS. 4–6, 7–9 and 10–12 by reference numerals 50, 60 and 70, respectively. It will be understood that elements of the second, third and fourth embodiments 50, 60 and 70 of the fastener clip that are common to those described with respect to the first embodiment 10 are referred to with common reference numerals 12–42 and the description of those elements with respect to the first embodiment 10 are incorporated by reference with respect to the second, third and fourth embodiments 50, 60 and 70, respectively.

Figure 4:
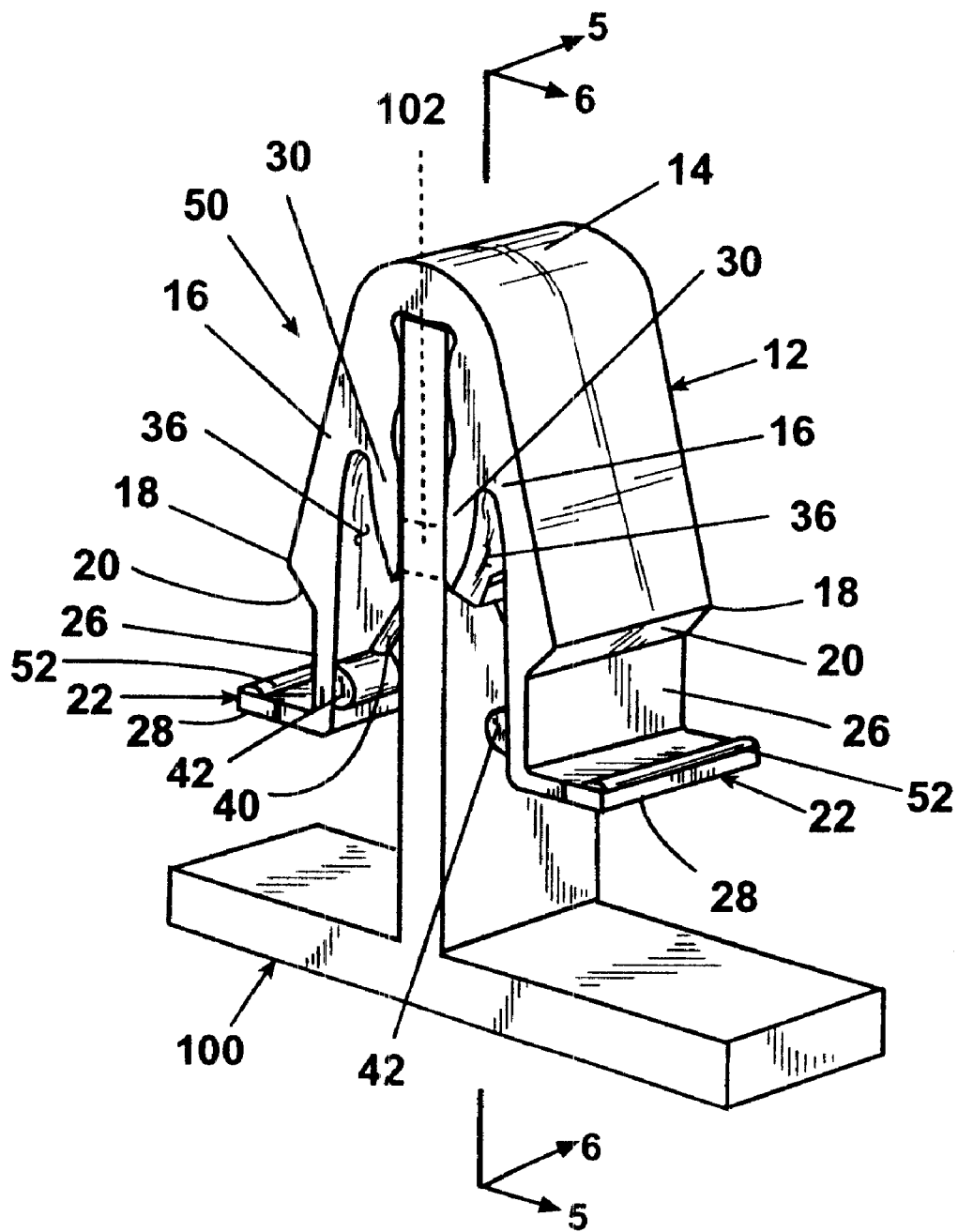
FIG. 4 shows a perspective view of a second embodiment of a fastener clip according to the invention showing the fastener clip mounted on an insertion rib having an insertion opening.
Figure 5:
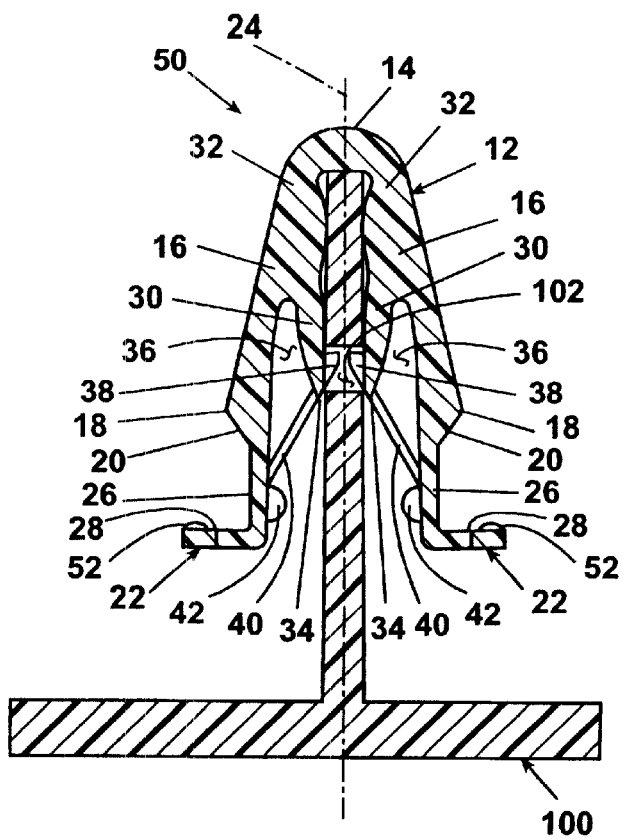
FIG. 5 is a cross-sectional view of the second embodiment of the fastener clip taken along lines 5—5 of FIG. 4.
Figure 6:
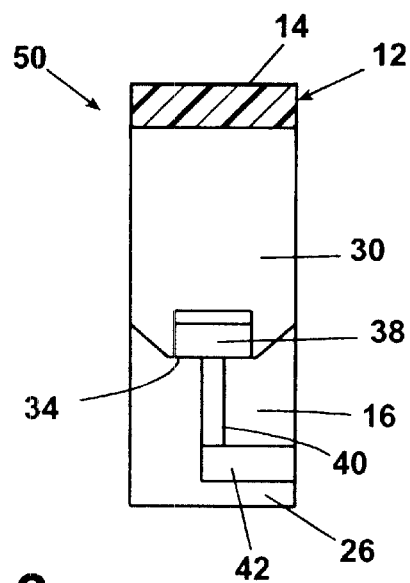
FIG. 6 is also a cross-sectional view of the second embodiment of the fastener clip taken along lines 6—6 of FIG. 4.

With reference to the second embodiment 50 shown in FIGS. 4–6, this embodiment 50 is virtually identical to the embodiment 10 shown in FIGS. 1–3 but for a tensioning rib 52 located on an upper surface of the generally horizontal portion 28 of the L-shaped flange 22. Although the tensioning rib 52 can be located anywhere along the width of the generally horizontal portion 28, it is preferred that the tensioning rib 52 be located adjacent to, or at, an outer end of the generally horizontal portion 28 thereof. The tensioning rib 52 functions to increase the tolerance of vehicular sub-structures available to be received in the receiving area defined by the ramped surfaces 20 and the L-shaped flanges 22. Since the vehicular sub-structures often include a foam core, the overall height of the vehicular sub-structure can vary widely. Therefore, the abutment of the tensioning rib 52 thereagainst places the generally horizontal portion 28 of the L-shaped flange in an increased amount of tension against an underside of a vehicular sub-structure.

Figure 7:
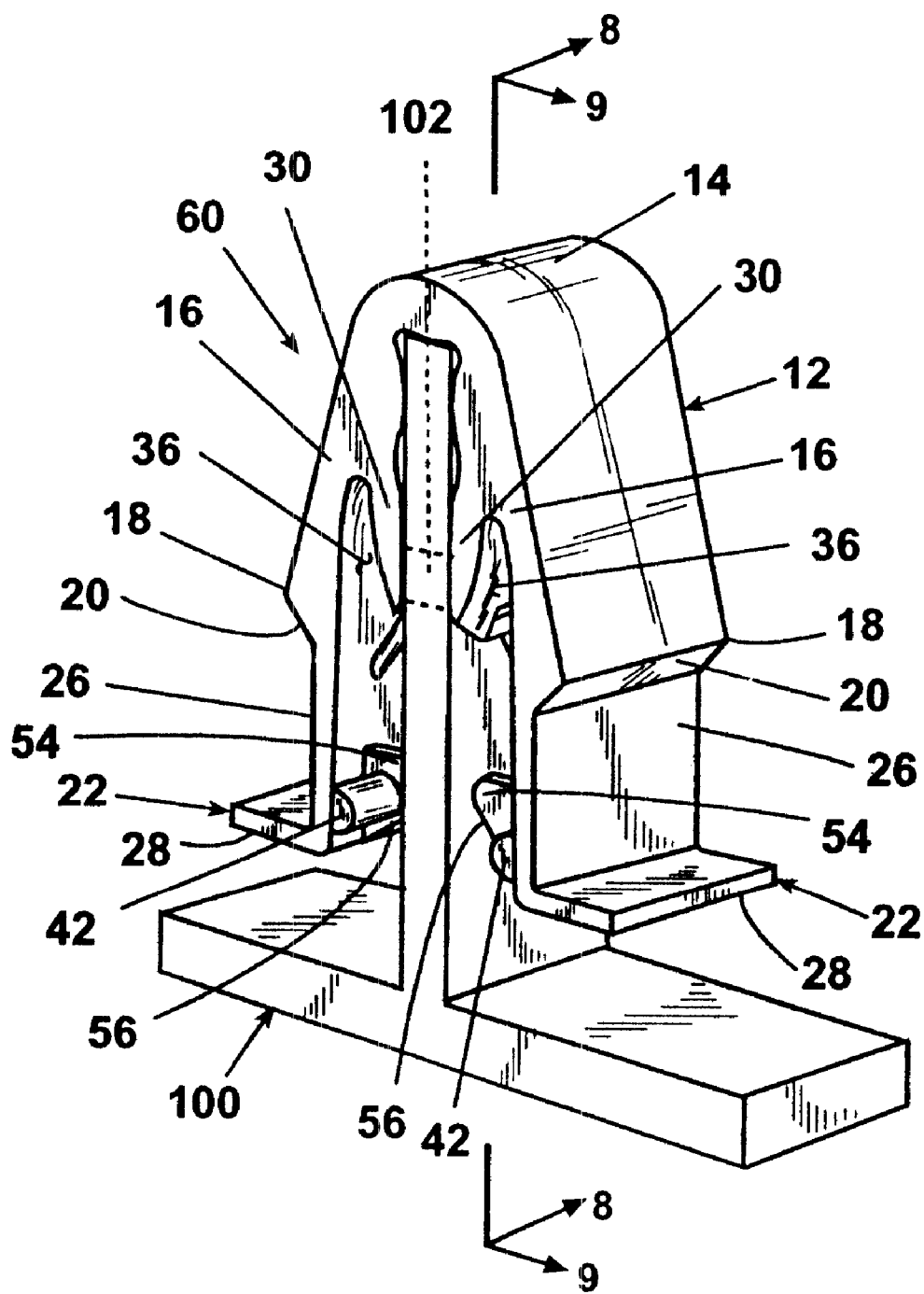
FIG. 7 shows a perspective view of a third embodiment of a fastener clip according to the invention showing the fastener clip mounted on an insertion rib having an insertion opening.
Figure 8:
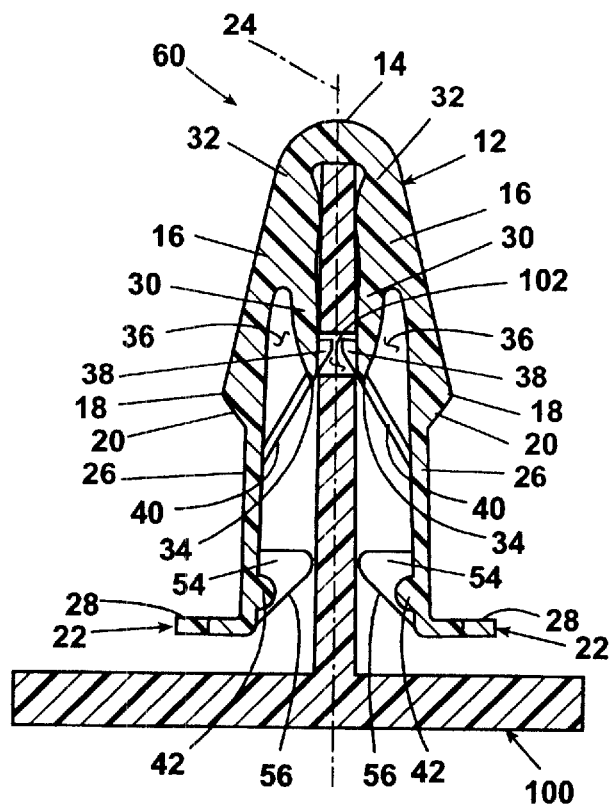
FIG. 8 is a cross-sectional view of the third embodiment of the fastener clip taken along lines 8—8 of FIG. 7.
Figure 9:
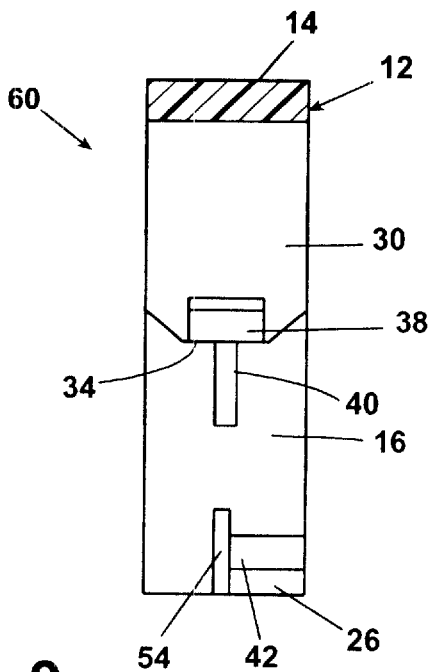
FIG. 9 is also a cross-sectional view of the third embodiment of the fastener clip taken along lines 9—9 of FIG. 7.

With reference to the third embodiment 60 shown in FIGS. 7–9, this embodiment 60 is virtually identical to the embodiment 10 shown in FIGS. 1–3 except that the third embodiment 60 is a taller clip used, for example, for spacing the insertion rib 100 farther from the vehicular sub-structure or for receiving a thicker vehicular sub-structure. In either event, the overall geometry results in a clip having a higher height-to-width aspect ratio.

Due to this longer geometry, the third embodiment 60 can have a higher tendency to fail around the bight portion 14 due to over-flexure of the outer legs 16 with respect to the medial axis 24. Therefore, the inner surfaces of each of the outer legs 16 are provided with stand-off protrusions 54 which extend inwardly from the inner surface of the outer legs 16 toward the medial axis 24. Preferably, the stand-off protrusions 54 are spaced downwardly (in the orientation shown in the drawings) from the distal end 34 of the inner legs 30 so as to not interfere with the engagement of the detents 38 within the insertion slot 102 of the insertion rib 100. Although the stand-off protrusions 54 can have any suitable cross-sectional shape including rectangular, semi-circular, triangular, etc., the stand-off protrusions 54 preferably have a ramped leading surface 56 to facilitate the passage of the insertion rib 100 therebetween. The stand-off protrusions 54 preferably extend inwardly a sufficient extent to preferably maintain contact with the insertion rib 100. In this manner and as can be seen from the drawings, thin-walled portions of the outer legs 16 are provided between the generally horizontal portions 28 of the L-shaped flanges 22 and the ramped surface 20 to accommodate increased flexure of the outer legs 16 thereabout.

Figure 10:
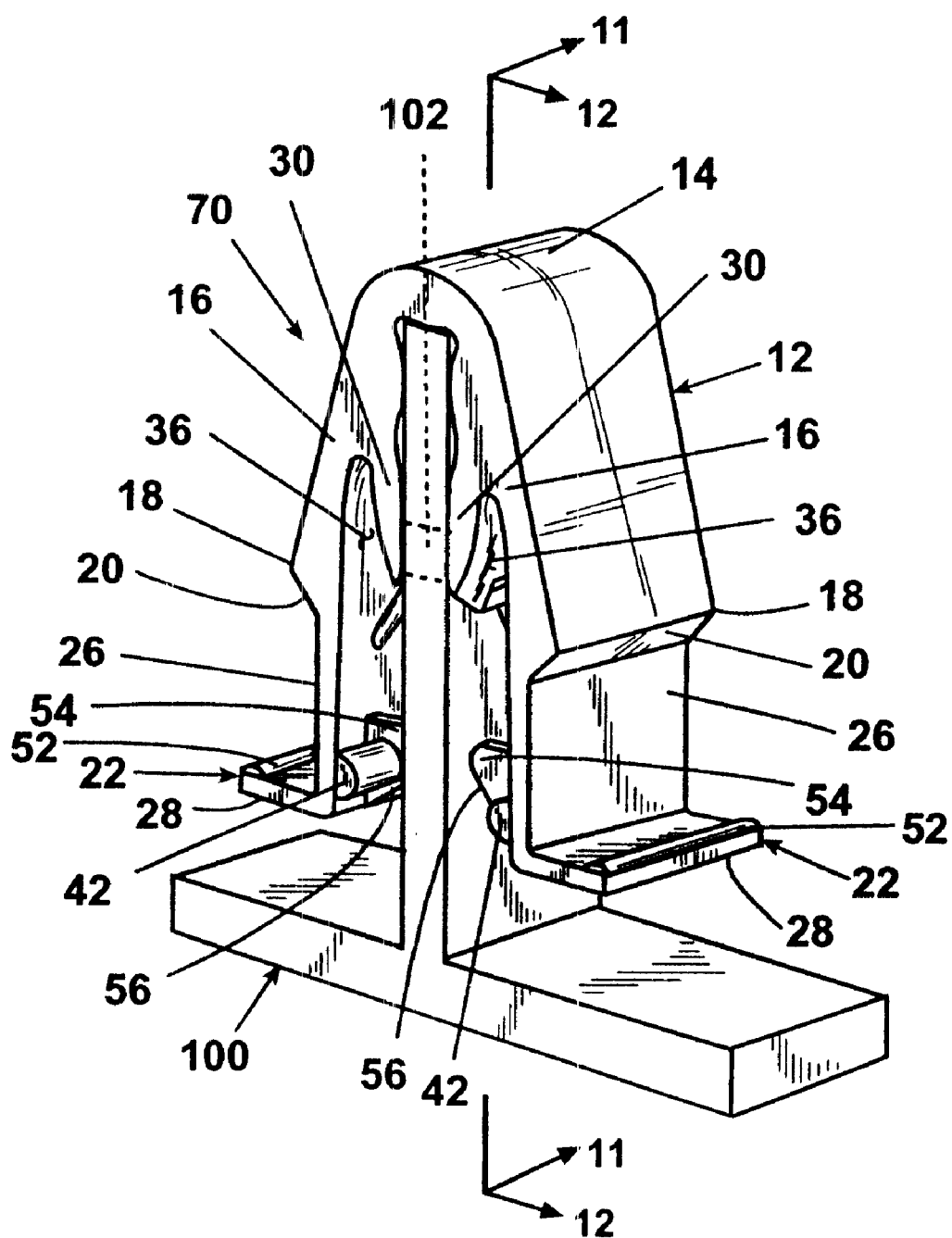
FIG. 10 shows a perspective view of a fourth embodiment of a fastener clip according to the invention showing the fastener clip mounted on an insertion rib having an insertion opening.
Figure 11:
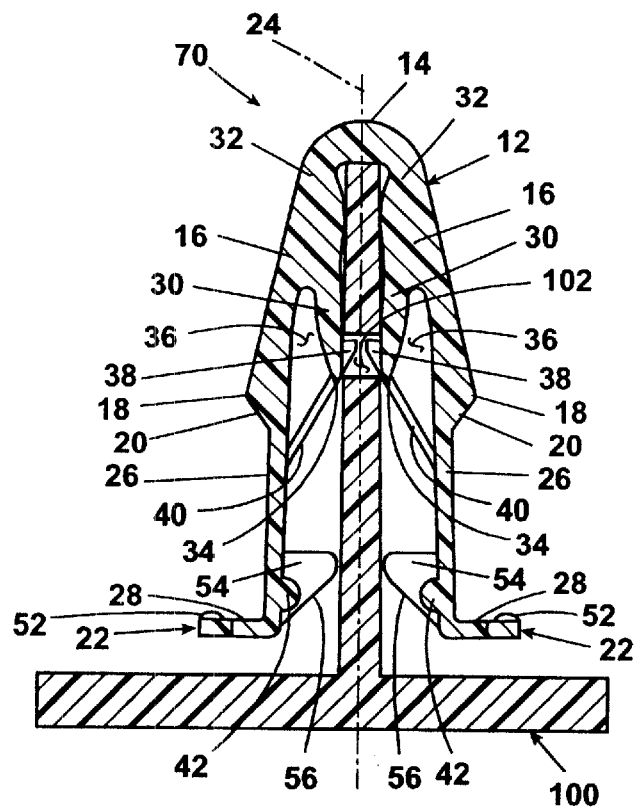
FIG. 11 is a cross-sectional view of the fourth embodiment of the fastener clip taken along lines 11—11 of FIG. 10.
Figure 12:
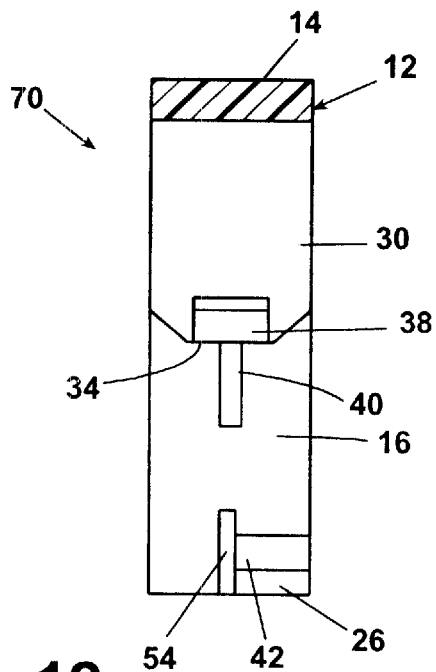
FIG. 12 is also a cross-sectional view of the fourth embodiment of the fastener clip taken along lines 12—12 of FIG. 10.

With reference to the fourth embodiment 70 shown in FIGS. 10–12, this embodiment 70 is virtually identical to the embodiment 60 shown in FIGS. 7–9 but for a tensioning rib 52 located on an upper surface of the generally horizontal portion 28 of the L-shaped flange 22 as described with respect to the second embodiment 50 shown in FIGS. 4–6.

Figure 13:
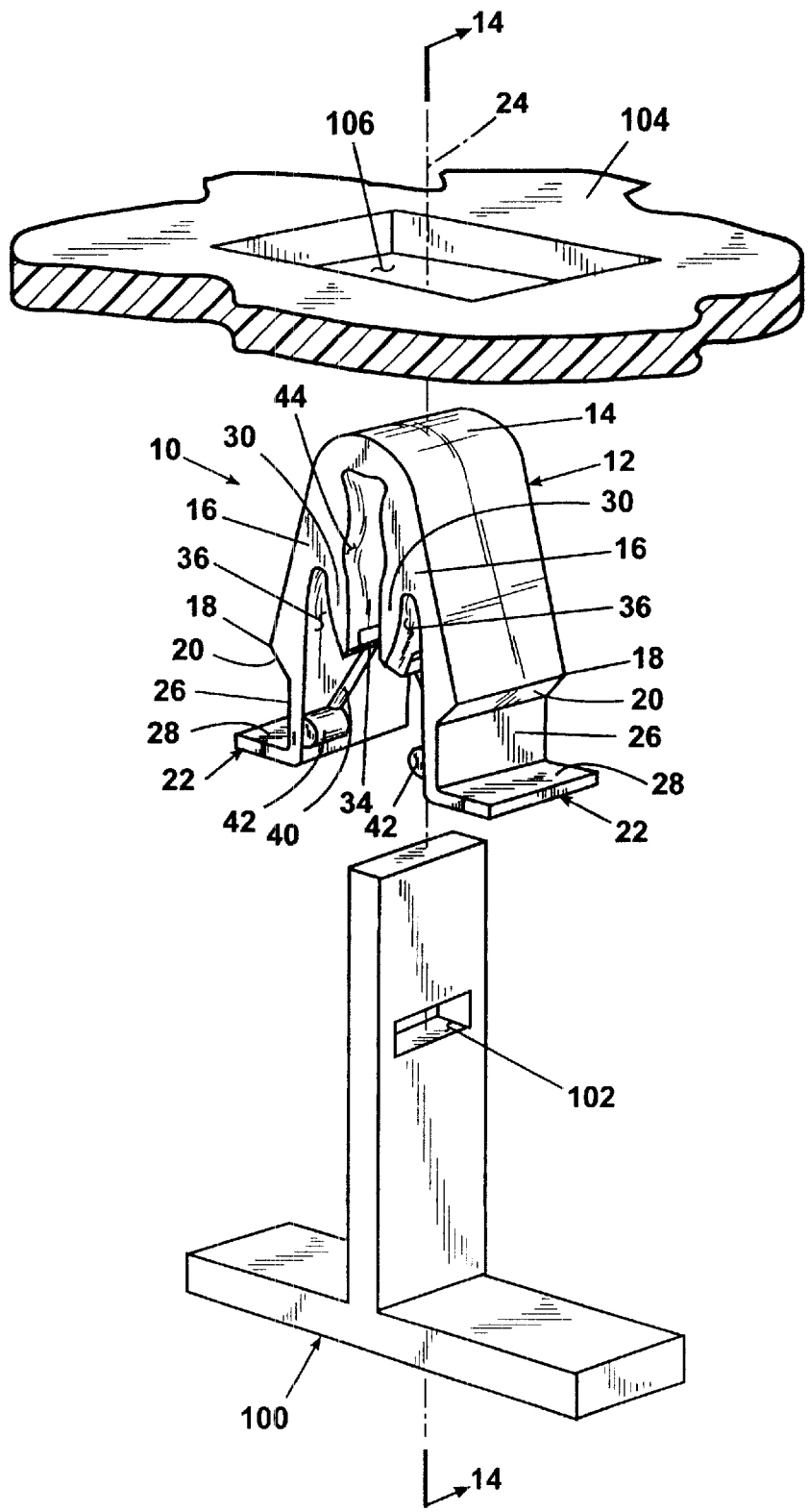
FIG. 13 is a perspective, exploded view of the first embodiment of the fastener clip shown in FIG. 1 according to the invention showing inner legs of the fastener clip aligned with an insertion rib having an insertion opening and outer legs of the fastener clip aligned with a mounting opening of a vehicular sub-structure.
Figure 14:
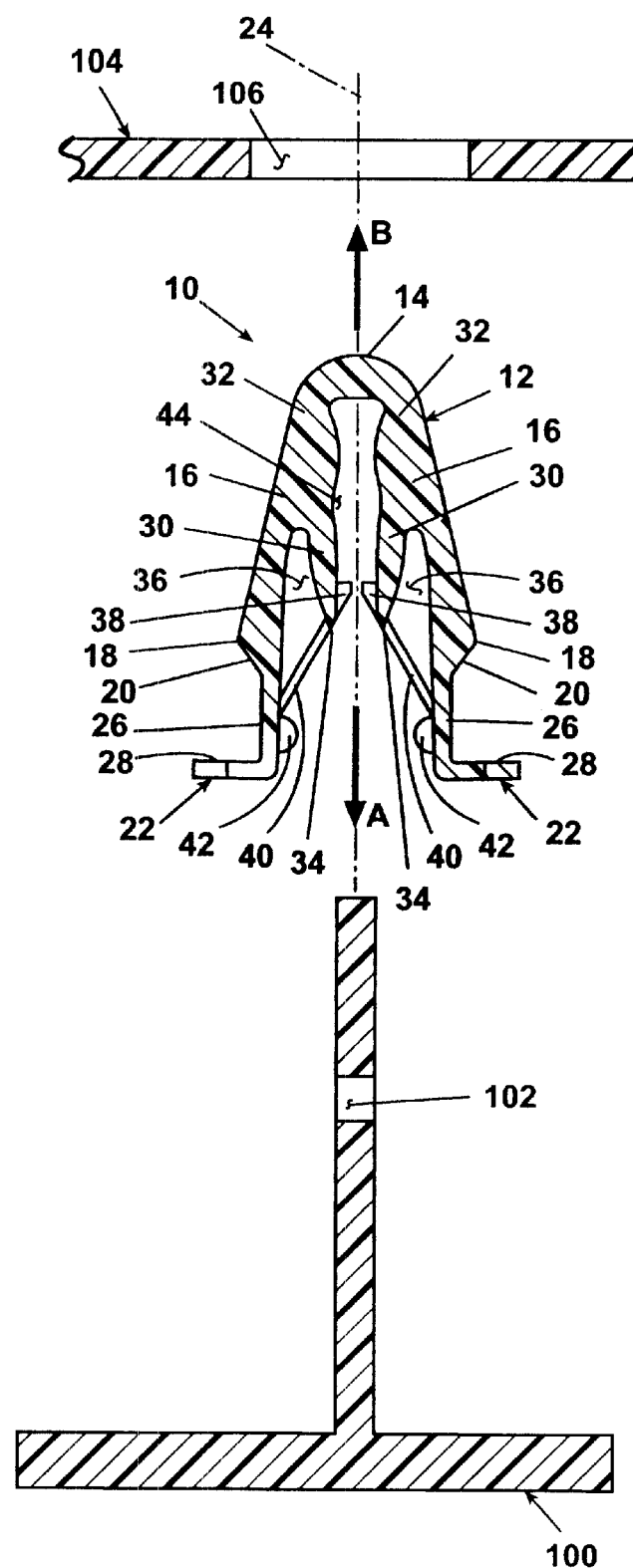
FIG. 14 is a cross-sectional view of the components shown in the perspective, exploded view of FIG. 13 taken along lines 14—14 of FIG. 13.
Figure 15:
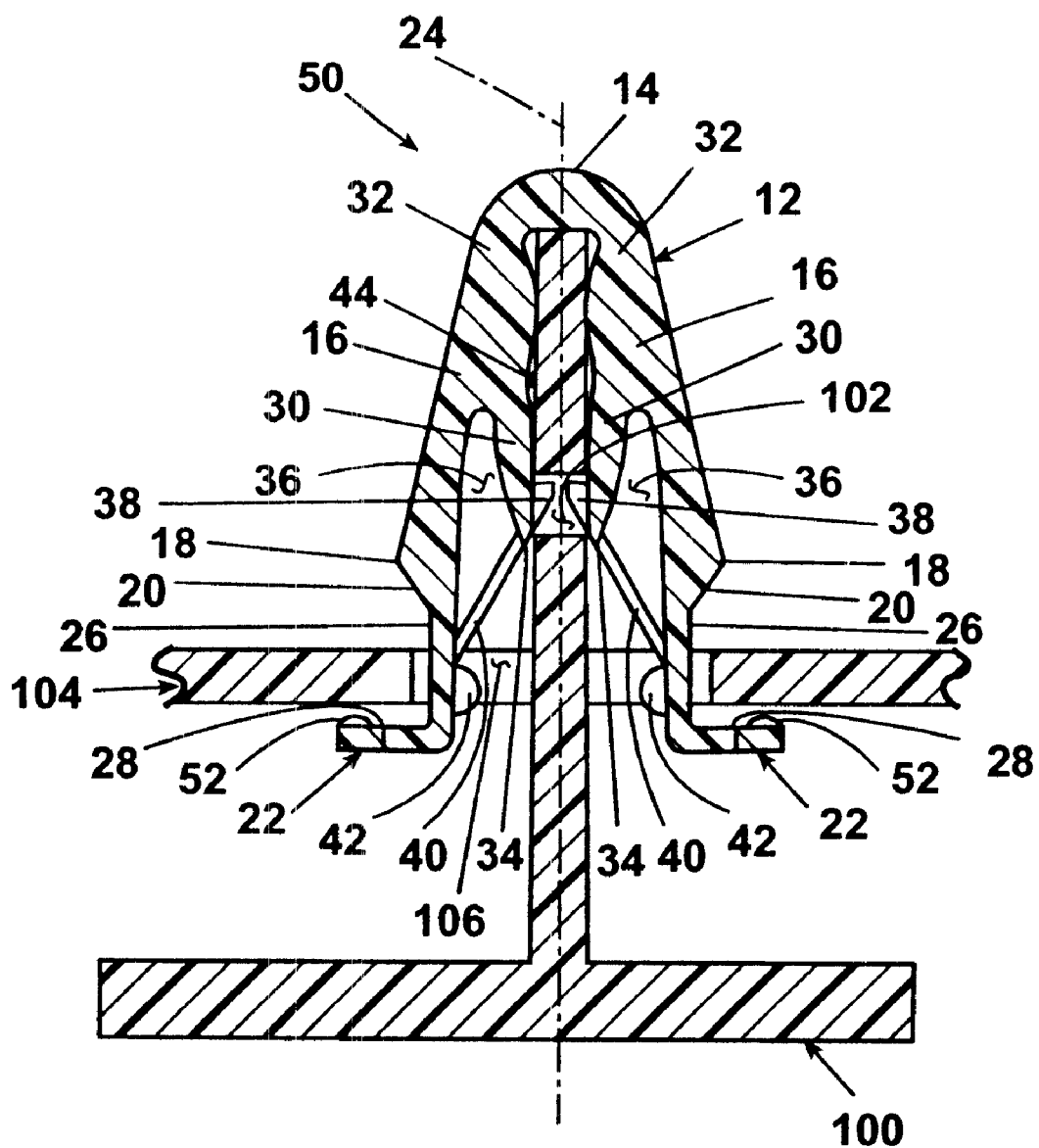
FIG. 15 is a cross-sectional view taken in the same orientation as FIG. 14 in which the first embodiment of the fastener clip shown in FIG. 1 has been mounted to both the insertion opening in the insertion rib and to the mounting opening in the vehicular sub-structure.

The assembly of the first embodiment 10 of the fastener clip described herein to both the insertion rib 100 (shown in FIG. 14 by arrow "A") and to the vehicular sub-structure 104 having the mounting opening 106 therein (shown in FIG. 14 by arrow "B") will not be described with reference to FIGS. 13–15. It will be understood that, although the first embodiment 10 of the fastener clip according to the invention is described with respect to the assembly of the first embodiment 10 to the insertion rib 100 and to the vehicular sub-structure 104, the description applies equally to the second, third and fourth embodiments 50, 60 and 70, respectively, and that the assembly and use of only the first embodiment 10 is described for purposes of brevity.

To assemble the fastener clip 10 onto the insertion rib 100, the fastener clip 10 and the insertion rib 100 are preferably aligned along the medial axis 24 and the fastener clip 10 is thereafter directed toward the upper end of the insertion rib 100. As the upper end of the insertion rib 100 reaches the distal and 34 of the inner legs 30 (after, of course, being urged past any stand-off protrusions 54), the upper end of the insertion rib 100 abuts the detents 38 and urges them apart so that the insertion rib 100 is passed between the opposed inner legs 30. Once the insertion rib 100 is urged between the inner legs 30 to a sufficient extent, the detents 38 encounter the insertion slot 102 and, through the resiliency of the clip 10, are urged into the insertion slot 102 back to the rest position of the inner legs 30. Thus, the fastener clip 10 is retained on the insertion rib 100 by the engagement of the detents 38 within the insertion slot 102.

To assemble the subassembly of the fastener clip 10 and the insertion rib 100 onto the vehicular sub-structure 104, the subassembly of the fastener clip 10 and the insertion rib 100 is aligned along the medial axis 24 with the mounting opening 106 of the vehicular sub-structure 104. The subassembly is thereafter urged toward the mounting opening 106 until the bight portion 14 of the clip 10 passes into the mounting opening 106. Further passage of the clip 10 into the mounting opening 106 causes the outer surfaces of the outer legs 16 to engage the edges of the mounting opening 106 of that the edges of the mounting opening 106 cam along the outer surfaces of the outer legs 16 until they reach the shoulders 18 thereof. At this point, the outer legs 16 preferably flex inwardly through the resiliency of the material making up the clip 10 about the bight portion 14 thereof so that the shoulders 18 of the clip 10 pass through the mounting opening 106. Once the shoulders 18 clear the mounting opening 106, the outer legs 16 spring back about the bight portion 14 to their rest position so that the edges of the mounting opening 106 are received within the receiving area defined by the ramped surfaces 20 and the L-shaped flanges 22. As will be understood, the edges of the mounting opening 106 cam down the ramped surfaces 20 until they reach the generally vertical portion 26 of the L-shaped flanges 22. At this point, the subassembly of the fastener clip 10 and the insertion rib 100 are mounted to the vehicular sub-structure 104.

Figure 16:
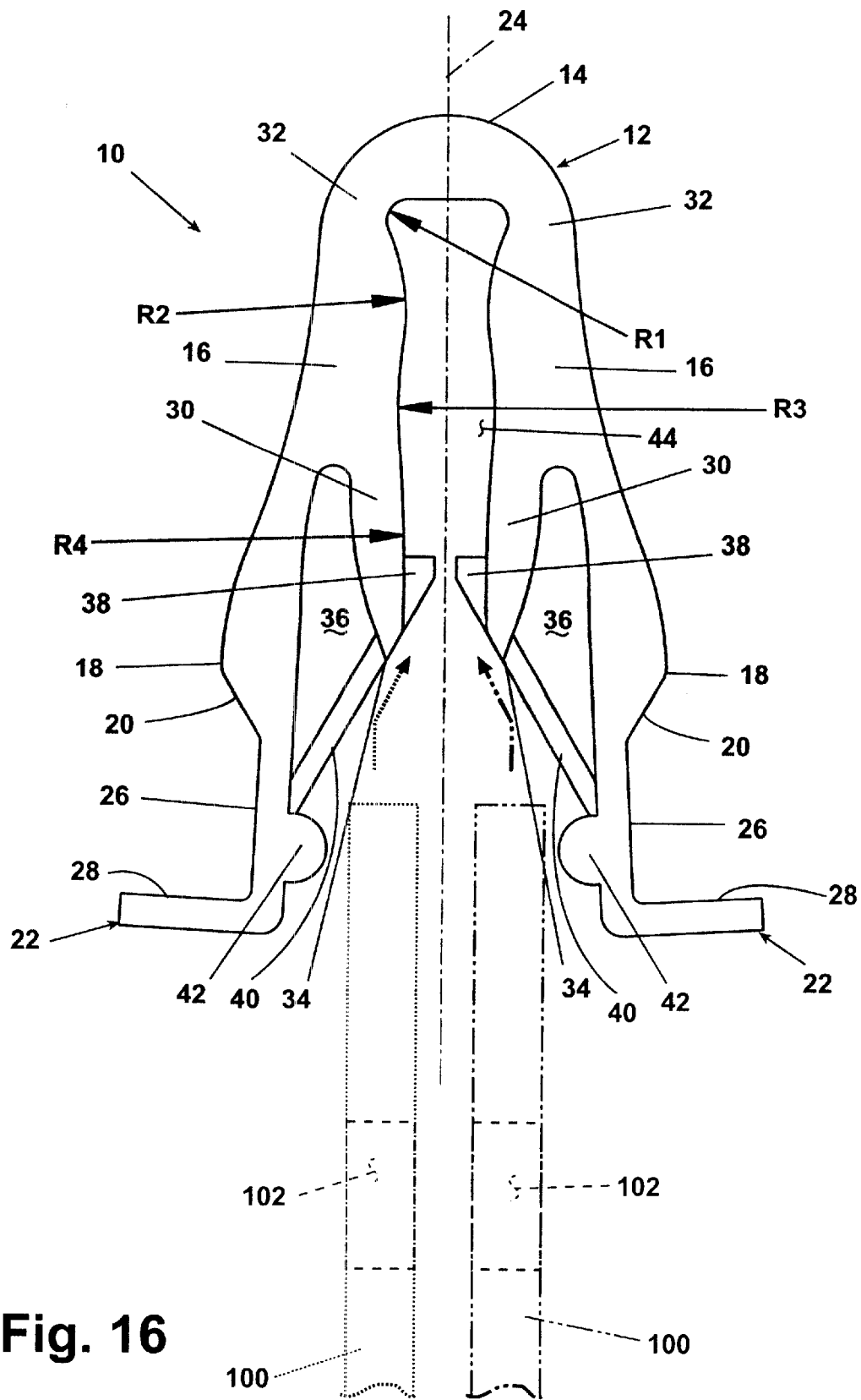
FIG. 16 is a side elevational view of the first embodiment of the fastener clip shown in FIG. 1 wherein the fastener clip is shown having a pair of guide straps corresponding to each of the inner legs thereof whereby the guide straps direct the insertion rib to its proper location between the inner legs as the insertion rib is mounted to the fastener clip.

Referring now to FIG. 16, sometimes it is difficult to align the fastener clip 10 and the insertion rib 100 along the medial axis 24 of that the insertion rib 100 is directly aligned with the detents 38 on the opposed inner legs 30 during the mounting of the fastener clip 10 onto the insertion rib 100. This difficulty in alignment is shown in by the pair of phantom-outlined insertion ribs 100 in FIG. 16. The guide members 40 provide a convenient solution to the problem of misalignment of the insertion rib 100 with the fastener clip 10 during the mounting of the fastener clip 10 onto the insertion rib 100. If the insertion rib 100 happens to be misaligned with the fastener clip 10, the upper end of the insertion rib 100 abuts the guide member 40 and prevents the insertion rib 100 from entering the gap 36 between the inner surface of the outer legs 16 and the outer surface of the inner legs 30. In fact, the upper end of the insertion rib 100 cams along the guide members 40 and around the distal end 34 of the inner legs 30 until the insertion rib 100 is properly positioned between the inner legs 30.

Figure 17:
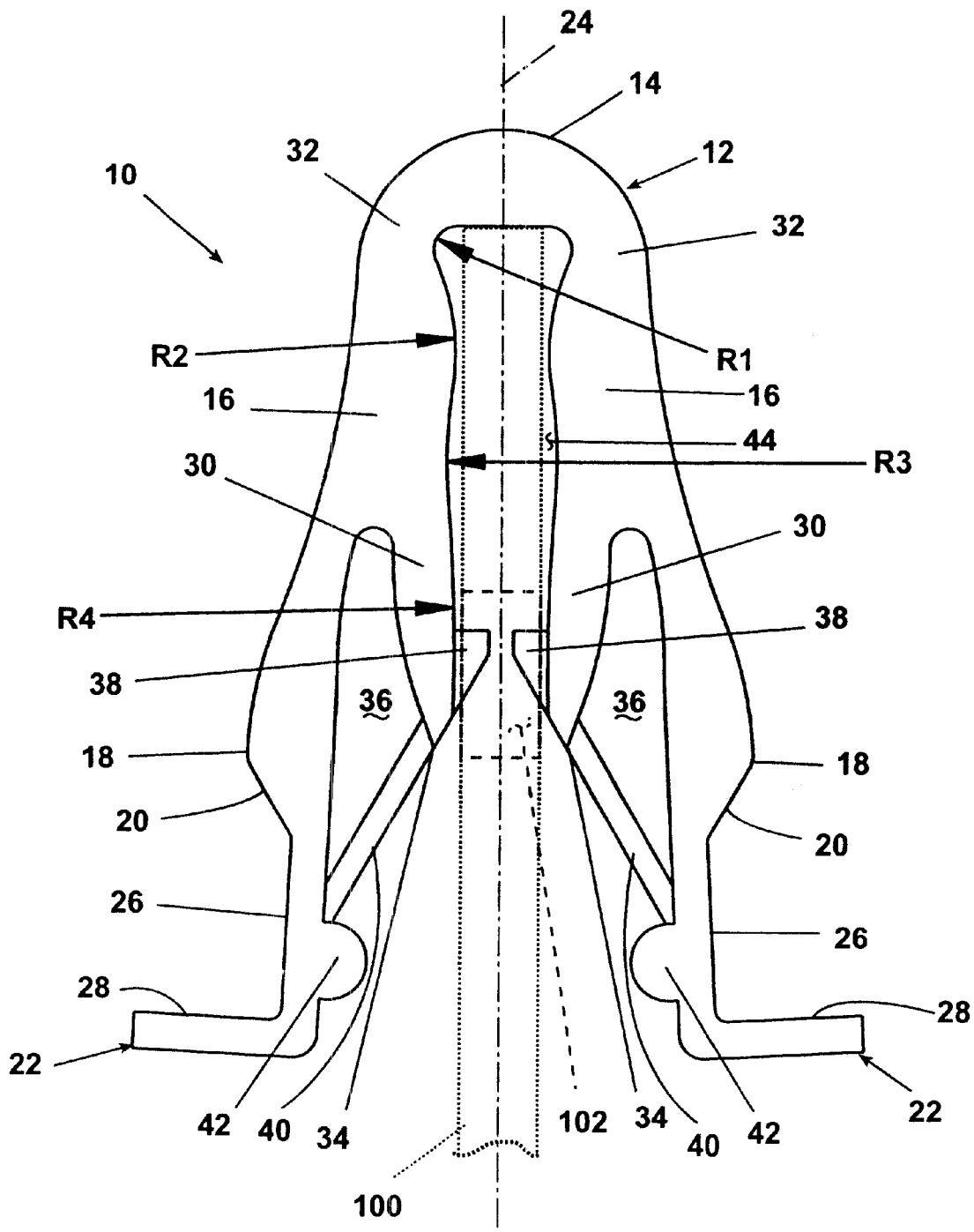
FIG. 17 is an enlarged side elevational view of the first embodiment of the fastener clip shown in FIG. 1 focusing on the variably curved surfaces on the inner surfaces of the inner legs thereof.
Figure 18:
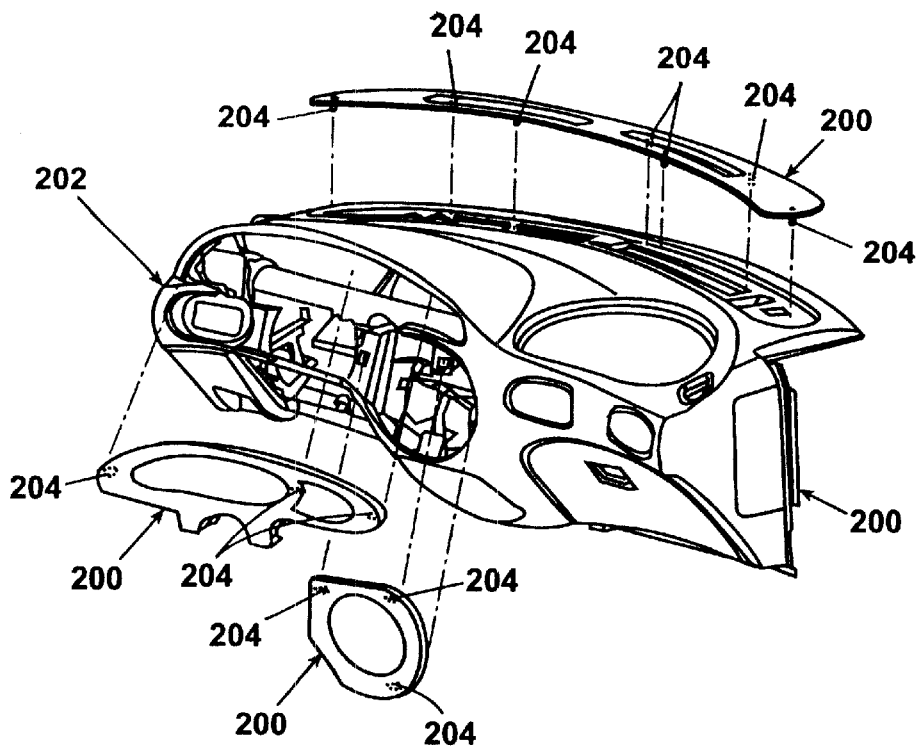
FIG. 18 is a prior art illustration of the mounting of a trim piece to a vehicular sub-structure, such as an instrument panel by several clips mounted on one portion to the trim piece and on another portion to the vehicular sub-structure.
Figure 19:
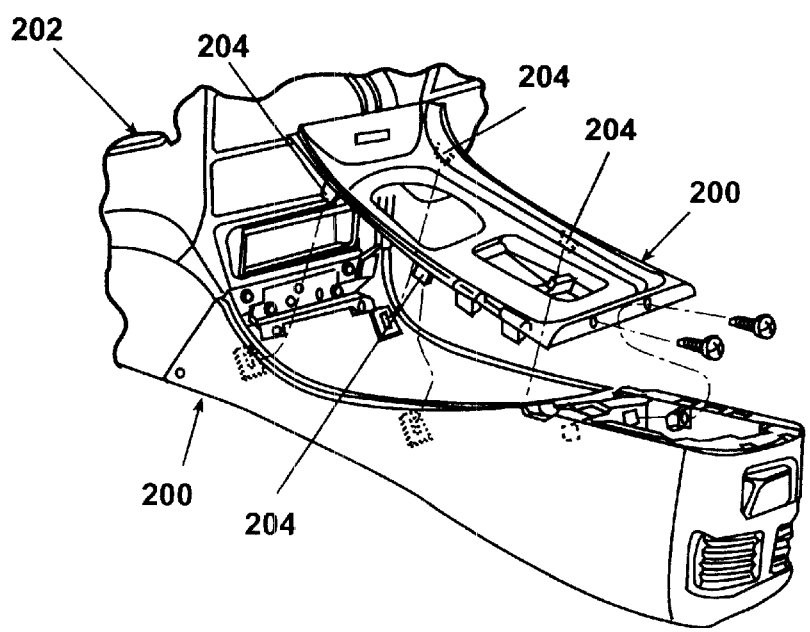
FIG. 19 is another prior art illustration of the mounting of a trim piece to a vehicular sub-structure by several clips.

Referring now to FIG. 17, it is an important feature of each of the embodiments 10, 50, 60 and 70 of the inventive clip shown herein that the inner surfaces of at least one of the inner legs 30 be provided with an alternating curved surface thereon which cooperate to define each lateral side of an elongated channel 44 between the inner surfaces of each of the inner legs 30 for receipt of the insertion rib 100. As shown in FIG. 17, the inner surface of the inner legs 30 is provided with first, second, third and fourth curved portions designated by R1, R2, R3 and R4, respectively.

The first curved portion R1 has a relatively tight radius of curvature forming an intersection between a proximal end 32 of each inner leg 30 and the bight portion 14 of the body 12.

The second curved portion R2 has a radius of curvature approximately ten times as large as that of the first curved portion R1 and extends in a relationship of opposed convexity to that of the first curved portion R1.

The third curved portion R3 has a radius of curvature approximately twice as large as that of the second curved portion R2 and extends in a relationship of opposed convexity to that of the second curved portion R2 and the same convexity to that of the first curved portion R1.

The fourth curved portion R4 has a radius of curvature approximately four times as large as that of the third curved portion R3 and extends in a relationship of opposed convexity to that of the first and third curved portions R1 and R3 and the same convexity to that of the second curved portion R2.

The second and fourth curved portions R2 and R4 provide "lines of contact" at their vertices between the inner surface of each inner leg 30 and the insertion rib 100. When the clip 10 is engaged on the insertion rib 100, the second and fourth curved surfaces R2 and R4, respectively, abut sidewalls of the insertion rib 100 and provide lines of contact thereagainst to keep the clip 10 stably in place on the insertion rib 100.

It can therefore be seen that the lines of contact provided by the abutment of the vertices of curved portions R2 and R4 against the insertion rib provide greater stability of the clip 10 against the insertion rib than the single-curve or planar inner legs shown in the prior art. The vertices of curved portions R2 and R4 provide a "pinching" action against each lateral side of the insertion rib 100 in multiple locations along a vertical axis of the insertion rib 100, thus preventing lateral or rotational misalignment of the clip 10 on the insertion rib. Further, the clip 10, having only lines of contact by the vertices of the above-mentioned curved portions R2 and R4, is easier to insert onto the insertion rib 100 than prior art clips having flat surfaces thereon due to the reduced friction, i.e., reduced abutting surface area, encountered between the inner surfaces of the inner legs 30 against the outer lateral sides of the insertion rib 100.

While the invention has been specifically described in connection with certain specific embodiments thereof, it is to be understood that this is by way of illustration and not of limitation, and the scope of the appended claims should be construed as broadly as the prior art will permit.

What is claimed is:

1. In a fastener for mounting a first structure having an insertion rib with a retention slot to a second structure having a mounting opening comprising a U-shaped body having:
    a bight portion at an upper portion thereof with a pair of outer legs depending therefrom, each of the pair of outer legs having an outer surface adapted to receive an edge of the mounting opening to removably mount the outer legs to the second structure; and
    a pair of inner legs between the pair of outer legs, the pair of inner legs cooperating to define at least in part an elongated channel therebetween having opposing inner surfaces adapted to receive the insertion rib, each of the inner legs having, at a lower portion thereof, a retainer adapted to be received within the retention slot;
    the improvement comprising:
        at least one of the inner surfaces of the elongated channel having a variable curvature thereon defining at least two lines of contact with the insertion rib separated by at least one non-contact portion, wherein the variable curvature is undulating with a first radius of curvature, a second radius of curvature, a third radius of curvature and a fourth radius of curvature in alternating convex/concave relationship.

2. The fastener of claim 1 wherein the second radius of curvature is approximately ten times as large as the first radius of curvature.

3. The fastener of claim 1 wherein the third radius of curvature is approximately two times as large as the second radius of curvature.

4. The fastener of claim 1 wherein the fourth radius of curvature is approximately four times as large as the third radius of curvature.

5. The fastener of claim 1 wherein both inner surfaces have the variable curvature.

6. The fastener of claim 5 wherein the variable curvature on one of the inner surfaces mirrors that on the other inner surface.

7. The fastener of claim 6 wherein the second and fourth radii of curvature define the at least two points of contact.

8. The fastener of claim 7 wherein the second radius of curvature is approximately ten times as large as the first radius of curvature.

9. The fastener of claim 8 wherein the third radius of curvature is approximately two times as large as the second radius of curvature.

10. The fastener of claim 9 wherein the fourth radius of curvature is approximately four times as large as the third radius of curvature.

11. The fastener of claim 1 wherein the pair of outer legs extend downwardly to a greater extent than the pair of inner legs; and further comprising guide members extending from the lower portion of the inner legs downwardly to the outer legs and forming a guide for aligning the insertion rib with the elongated channel as the insertion rib is inserted between the pair of outer legs.

12. The fastener of claim 11 wherein the guide members are flexible and flex with the flexure of the inner and outer legs.

13. The fastener of claim 12 wherein the retainer has a leading edge thereon for camming the inner legs apart during mounting of the fastener onto the insertion rib.

14. The fastener of claim 13 wherein the guide member has a leading edge in planar alignment with the retainer leading edge.

15. The fastener of claim 1 wherein the outer surface of the pair of outer legs has a shoulder adapted to receive an upper edge of the mounting opening.

16. The fastener of claim 15 wherein a lower portion of at least one of the outer legs terminates in an outwardly extending flange that is adapted to abut an underside of the second structure during mounting of the fastener to the second structure.

17. The fastener of claim 16 wherein the outwardly-extending flange has an upwardly-extending tensioning rib thereon adapted to abut the underside of the second structure to bias the second structure against the shoulder whereby the fastener can be used with second structures of varying thickness and tolerances.

18. The fastener of claim 17 wherein the tensioning rib is generally semi-circular in cross section.

19. The fastener of claim 17 wherein the tensioning rib is located at an outer portion of the outwardly-extending flange.

20. The fastener of claim 19 wherein the tensioning rib is generally semi-circular in cross section.

21. The fastener of claim 1 wherein a lower portion of at least one of the pair of outer legs further comprises a stand-off protrusion extending inwardly a sufficient extent to maintain contact with the insertion rib when the insertion rib is positioned within the elongated channel to prevent inward flexing of the lower portion of the at least one of the pair of outer legs during mounting of the fastener to the second structure and inadvertent overtravel of the fastener relative to the mounting opening thereof.

22. The fastener of claim 21 wherein the outer legs have a thin-walled portion between the guide member and the stand-off protrusion to facilitate flexure of the outer legs therebetween.

23. The fastener of claim 21 wherein the stand-off protrusions form a fulcrum for flexure of the pair of outer legs during mounting of the fastener to the second structure.

24. The fastener of claim 21 wherein each of the pair of outer legs have a standoff protrusion thereon.

25. The fastener of claim 21 wherein the lower portion of the at least one of the pair of the outer legs terminates in an outwardly extending flange that is adapted to abut an underside of the second structure when the fastener is mounted to the second structure.

26. The fastener of claim 25 wherein the outwardly extending flange is spaced downwardly from the stand-off protrusion.

27. The fastener of claim 26 wherein the guide member is spaced upwardly from the stand-off protrusion to permit flexure of the outer legs therebetween.

28. In a fastener for mounting a first structure having an insertion rib with a retention slot to a second structure having a mounting opening comprising a U-shaped body having:
    a bight portion at an upper portion thereof with a pair of outer legs depending therefrom, each of the pair of outer legs having an outer surface adapted to receive an edge of the mounting opening to removably mount the outer legs to the second structure; and
    a pair of inner legs between the pair of outer legs, the pair of inner legs cooperating to define at least in part an elongated channel therebetween having opposing inner surfaces adapted to receive the insertion rib, each of the inner legs having, at a lower portion thereof, a retainer adapted to be received within the retention slot;

the improvement comprising:
   a lower portion of at least one of the pair of outer legs further comprises a stand-off protrusion extending inwardly a sufficient extent to maintain contact with the insertion rib when the insertion rib is positioned within the elongated channel to prevent inward flexing of the lower portion of the at least one of the pair of outer legs during mounting of the fastener to the second structure and inadvertent overtravel of the fastener relative to the mounting opening thereof.

29. The fastener of claim 28 wherein the stand-off protrusions form a fulcrum for flexure of the pair of outer legs during mounting of the fastener to the second structure.

30. The fastener of claim 28 wherein each of the pair of outer legs have a stand-off protrusion thereon.

31. The fastener of claim 28 wherein the lower portion of the at least one of the pair of the outer legs terminates in an outwardly extending flange that is adapted to abut an underside of the second structure when the fastener is mounted to the second structure.

32. The fastener of claim 31 wherein the outwardly extending flange is spaced downwardly from the stand-off protrusion.

33. The fastener of claim 32 and further comprising guide members extending from the lower portion of the inner legs downwardly to the outer legs and forming a guide for aligning the insertion rib with the elongated channel as the insertion rib is inserted between the pair of outer legs.

34. The fastener of claim 33 wherein each guide member is spaced upwardly from the stand-off protrusion to permit flexure of the outer legs therebetween.

35. The fastener of claim 34 wherein the outer legs have a thin-walled portion between the guide member and the stand-off protrusion to facilitate flexure of the outer legs therebetween.

36. The fastener of claim 35 wherein the stand-off protrusions form a fulcrum for flexure of the pair of outer legs during mounting of the fastener to the second structure.

37. The fastener of claim 36 wherein each of the pair of outer legs have a stand-off protrusion thereon.

38. The fastener of claim 28 and further comprising guide members extending from the lower portion of the inner legs downwardly to the outer legs and forming a guide for aligning the insertion rib with the elongated channel as the insertion rib is inserted between the pair of outer legs.

39. The fastener of claim 38 wherein each guide member is spaced upwardly from the stand-off protrusion to permit flexure of the outer legs therebetween.

40. The fastener of claim 38 wherein the outer legs have a thin-walled portion between the guide member and the stand-off protrusion to facilitate flexure of the outer legs therebetween.

41. In a fastener for mounting a first structure having an insertion rib with a retention slot to a second structure having a mounting opening comprising a U-shaped body having:
   a bight portion at an upper portion thereof with a pair of outer legs depending therefrom, each of the pair of outer legs having an outer surface with a shoulder adapted to receive an edge of the mounting opening to removably mount the outer legs to the second structure, wherein a lower portion of at least one of the outer legs terminates in an outwardly extending flange that is adapted to abut an underside of the second structure during mounting of the fastener to the second structure; and
   a pair of inner legs between the pair of outer legs, the pair of inner legs cooperating to define at least in part an elongated channel therebetween having opposing inner surfaces adapted to receive the insertion rib, each of the inner legs having, at a lower portion thereof, a retainer adapted to be received within the retention slot;
  the improvement comprising:
   the outwardly-extending flange having an upwardly-extending tensioning rib thereon adapted to abut the underside of the second structure to bias the second structure against the shoulder whereby the fastener can be used with second structures of varying thickness and tolerances.

42. The fastener of claim 41 wherein the tensioning rib is generally semi-circular in cross section.

43. The fastener of claim 41 wherein the tensioning rib is located at an outer portion of the outwardly-extending flange.

44. The fastener of claim 43 wherein the tensioning rib is generally semi-circular in cross section.

45. The fastener of claim 41 wherein the pair of outer legs extend downwardly to a greater extent than the pair of inner legs; and further comprising guide members extending from the lower portion of the inner legs downwardly to the outer legs and forming a guide for aligning the insertion rib with the elongated channel as the insertion rib is inserted between the pair of outer legs.

46. The fastener of claim 45 wherein the guide members are flexible and flex with the flexure of the inner and outer legs.

47. The fastener of claim 46 wherein the retainer has a leading edge thereon for camming the inner legs apart during mounting of the fastener onto the insertion rib.

48. The fastener of claim 47 wherein the guide member has a leading edge in planar alignment with the retainer leading edge.

49. In a fastener for mounting a first structure having an insertion rib with a retention slot to a second structure having a mounting opening comprising a U-shaped body having:
   a bight portion at an upper portion thereof with a pair of outer legs depending therefrom, each of the pair of outer legs having an outer surface adapted to receive an edge of the mounting opening to removably mount the outer legs to the second structure; and
   a pair of inner legs between the pair of outer legs, the pair of inner legs cooperating to define at least in part an elongated channel therebetween having opposing inner surfaces adapted to receive the insertion rib, each of the inner legs having, at a lower portion thereof, a retainer adapted to be received within the retention slot;
  the improvement comprising:
   at least one of the inner surfaces of the elongated channel having a variable curvature thereon defining at least two lines of contact with the insertion fib in a spaced vertical relationship; and
   wherein a lower portion of at least one of the pair of outer legs further comprises a stand-off protrusion extending inwardly a sufficient extent to maintain contact with the insertion rib when the insertion rib is positioned within the elongated channel to prevent inward flexing of the lower portion of the at least one of the pair of outer legs during mounting of the fastener to the second structure and inadvertent overtravel of the fastener relative to the mounting opening thereof.

50. The fastener of claim 49 wherein the outer legs have a thin-walled portion between the guide member and the stand-off protrusion to facilitate flexure of the outer legs therebetween.

51. The fastener of claim 49 wherein the stand-off protrusions form a fulcrun for flexure of the pair of outer legs during mounting of the fastener to the second structure.

52. The fastener of claim 49 wherein each of the pair of outer legs have a stand-off protrusion thereon.

53. The fastener of claim 49 wherein the lower portion of the at least one of the pair of the outer legs terminates in an outwardly extending flange that is adapted to abut an underside of the second structure when the fastener is mounted to the second structure.

54. The fastener of claim 53 wherein the outwardly extending flange is spaced downwardly from the stand-off protrusion.

55. The fastener of claim 54 wherein the guide member is spaced upwardly from the stand-off protrusion to permit flexure of the outer legs therebetween.

56. In a fastener for mounting a first structure having an insertion rib with a retention slot to a second structure having a mounting opening comprising a U-shaped body having:

a bight portion at an upper portion thereof with a pair of outer legs depending therefrom, each of the pair of outer legs having an outer surface adapted to receive an edge of the mounting opening to removably mount the outer legs to the second structure; and a pair of inner legs between the pair of outer legs, the pair of inner legs cooperating to define at least in part an elongated channel therebetween having opposing inner surfaces adapted to receive the insertion rib, each of the inner legs having, at a lower portion thereof, a retainer adapted to be received within the retention slot;

the improvement comprising:

the pair of outer legs extend downwardly to a greater extent than the pair of inner legs;

further comprising guide members extending from the lower portion of the inner legs downwardly to the outer legs and forming a guide for aligning the insertion rib with the elongated channel as the insertion rib is inserted between the pair of outer legs; and wherein a lower portion of at least one of the pair of outer legs further comprises a stand-off protrusion extending inwardly a sufficient extent to maintain contact with the insertion rib when the insertion rib is positioned within the elongated channel to prevent inward flexing of the lower portion of the at least one of the pair of outer legs during mounting of the fastener to the second structure and inadvertent overtravel of the fastener relative to the mounting opening thereof.

57. The fastener of claim 56 wherein the guide member is spaced upwardly from the stand-off protrusion to permit flexure of the outer legs therebetween.

58. The fastener of claim 56 wherein the outer legs have a thin-walled portion between the guide member and the stand-off protrusion to facilitate flexure of the outer legs therebetween.

59. The fastener of claim 56 wherein the stand-off protrusions form a fulcrum for flexure of the pair of outer legs during mounting of the fastener to the second structure.

60. The fastener of claim 56 wherein each of the pair of outer legs have a stand-off protrusion thereon.

61. The fastener of claim 56 wherein the outwardly-extending flange having an upwardly-extending tensioning rib thereon adapted to abut the underside of the second structure to bias the second structure against the shoulder whereby the fastener can be used with second structures of varying thickness and tolerances.

62. The fastener of claim 56 wherein the lower portion of the at least one of the pair of the outer legs terminates in an outwardly extending flange that is adapted to abut an underside of the second structure when the fastener is mounted to the second structure.

63. The fastener of claim 62 wherein the outwardly extending flange is spaced downwardly from the stand-off protrusion.

64. The fastener of claim 63 wherein the guide member is spaced upwardly from the stand-off protrusion to permit flexure of the outer legs therebetween.

* * * * *

UNITED STATES PATENT AND TRADEMARK OFFICE
CERTIFICATE OF CORRECTION

PATENT NO.     : 6,449,814 B1  
DATED          : September 17, 2002  
INVENTOR(S)    : Michael A. Dinsmore et al.

It is certified that error appears in the above-identified patent and that said Letters Patent is hereby corrected as shown below:

<u>Column 14,</u>  
Line 52, "fib" should be -- rib. --

Signed and Sealed this

Seventeenth Day of December, 2002

JAMES E. ROGAN  
*Director of the United States Patent and Trademark Office*